Figure 1:
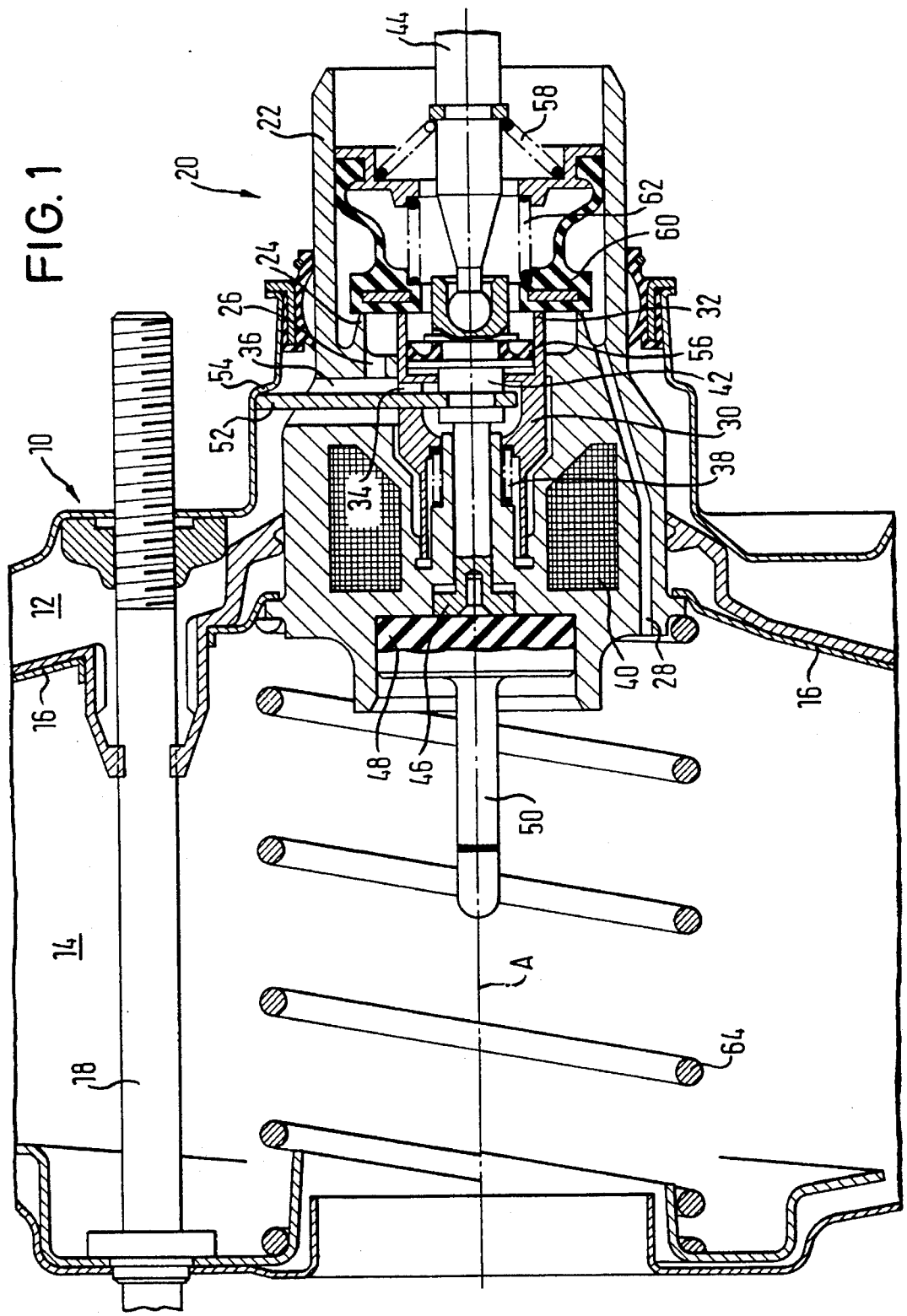

United States Patent [19]

Heibel et al.

[11] Patent Number: 5,479,844
[45] Date of Patent: Jan. 2, 1996

[54] PNEUMATIC BOOSTER WITH ELECTROMAGNETIC SERVO CONTROL, ESPECIALLY FOR MOTOR VEHICLE BRAKE SYSTEMS

[75] Inventors: Helmut Heibel, Moschheim; Josef Pickenhahn, Plaidt, both of Germany

[73] Assignee: Lucas Industries Public Limited Company, West Midlands, United Kingdom

[21] Appl. No.: 284,663

[22] PCT Filed: Apr. 6, 1993

[86] PCT No.: PCT/EP93/00855

§ 371 Date: Aug. 19, 1994

§ 102(e) Date: Aug. 19, 1994

[87] PCT Pub. No.: WO93/21048

PCT Pub. Date: Oct. 28, 1993

[30] Foreign Application Priority Data

Apr. 8, 1992 [DE] Germany ............... 4211849

[51] Int. Cl.[6] ..................... F15B 9/10
[52] U.S. Cl. .......... 91/369.2; 91/369.3; 91/376 R
[58] Field of Search ............. 91/369.1, 369.2, 91/369.3, 376 R; 92/96, 98 R

[56] References Cited

U.S. PATENT DOCUMENTS

| | | | |
|---|---|---|---|
| 4,587,885 | 5/1986 | Boehm et al. | 91/369.3 X |
| 4,732,242 | 3/1988 | Heibel . | |
| 4,756,231 | 7/1988 | Kobayashi et al. | 91/369.2 |
| 4,775,033 | 10/1988 | Heibel . | |
| 4,819,996 | 4/1989 | Belart et al. | 91/376 R X |
| 4,852,700 | 8/1989 | Heibel . | |
| 5,022,717 | 6/1991 | Heibel et al. . | |
| 5,029,515 | 7/1991 | Endo | 91/369.3 X |
| 5,080,203 | 1/1992 | Heibel . | |
| 5,146,837 | 9/1992 | Inoue | 91/369.2 |
| 5,178,441 | 1/1993 | Heibel et al. . | |
| 5,331,813 | 7/1994 | Heibel et al. . | |

FOREIGN PATENT DOCUMENTS

| | | |
|---|---|---|
| 3920766A1 | 1/1991 | Germany . |
| 2142396 | 1/1985 | United Kingdom . |
| 2226611 | 7/1990 | United Kingdom . |

*Primary Examiner*—Edward K. Look
*Assistant Examiner*—Hoang Nguyen
*Attorney, Agent, or Firm*—Oblon, Spivak, McClelland, Maier & Neustadt

[57] ABSTRACT

Two chambers (12, 14) in a booster casing (10) are separated by a movable wall (16) which is connected to a valve housing (22). The housing contains a movable sealing member (60) with which a first valve seat (24), formed in the valve housing (22), and a second valve seat (32), formed on a movable valve closing member (30), are associated. The valve closing member (30) is guided for axial displacement on a piston (42) and designed as the armature of an electromagnet (40) which is arranged inside the valve housing (22) in such a way that, when energized, it moves the valve closing member (30) away from the sealing member (60) against the resistance of a valve spring (38). The piston (42) is guided for axial displacement in the valve housing (22) and serves to transmit actuating forces from an actuator member (44) to an output member (50). An abutment member (52) fastened to the piston (42) extends outwardly with axial clearance through radial recesses (34, 36) formed in the valve closing member (30) and the valve housing (22), respectively. The abutment member defines a common position of rest of the valve closing member (30) and the piston (42) by abutting against a stop (54) formed at a booster casing (10), when the actuator member (44) is inoperative. At this position of rest, the valve spring (38) holds both the valve closing member (30) against the abutment member (52) and the second valve seat (32) against the sealing member (60).

8 Claims, 2 Drawing Sheets

PNEUMATIC BOOSTER WITH ELECTROMAGNETIC SERVO CONTROL, ESPECIALLY FOR MOTOR VEHICLE BRAKE SYSTEMS

The invention relates to a pneumatic booster with electromagnetic servo control, especially for motor vehicle brake systems as recited in the preamble of claim 1.

In a known brake pressure booster of this kind (EP 0 478 396) the abutment member is secured to the valve housing and the piston has a broad annular groove engaged, with axial clearance, by the abutment member. Behind the groove, in axial direction, the piston has a second, narrower annular groove followed axially by a cylindrical section on which the valve closing member is guided for axial displacement. The valve closing member has a rear end which is bent radially inwardly like a hook and engages with axial clearance in the second annular groove of the piston, whereby the axial relative movability of the valve closing member with respect to the piston is limited. The electromagnet is disposed at an axial distance behind the sealing member, it comprises a coil which is fastened on the actuator member as well as a sleeve-like armature which is guided for axial displacement on the actuator member. In the area of its rear end, the valve closing member has a flange which projects radially inwardly at an axial distance behind the rear end of the piston. The valve spring is located between this flange and the piston. Between the flange and the armature, a sleeve is guided on the actuator member to be pushed forwardly by the armature upon excitation of the electromagnet. Hereby it displaces the valve closing member, too, in forward direction away from the sealing member. In this manner, forward movement of the valve closing member can be effected electromagnetically, independently of or in addition to forward movement of the piston caused by way of the actuator member, so as to separate the two chambers in the valve housing from each other and let ambient air flow into the rear chamber.

With this known booster, the normal position of the valve closing member is defined exclusively by the position of the sealing member which is engaged by the second valve seat formed at the valve closing member, while the sealing member itself engages the first valve seat which is formed at the valve housing. The full force of the valve spring acts through the valve closing member on the sealing member so that the latter must be loaded in opposite direction by a corresponding stronger spring to make sure it can engage the first valve seat. The positioning of the valve closing member depends on the location of the valve housing, on certain tolerances of length of the same, and on elastic deformations of the sealing member and, as a consequence, it is inaccurate. Due to this inaccurate positioning of the valve closing member the relative motions between the two valve seats and the sealing member which are needed to initiate and terminate a normal braking operation can be achieved only by relatively great axial movements of the actuator member. This means that corresponding distances of loss occur at a brake pedal, or the like, which is connected to the actuator member.

It is the object of the invention to improve a brake pressure booster of the kind specified initially in such manner that it can be controlled especially sensitively by small movements of the actuator member.

The object is met, according to the invention, by the features of claim 1.

True, a pneumatic brake pressure booster is known (EP 0 405 603 A2) with which a piston or tappet disposed between an actuator member and an output member is adapted to find support on a stop of the booster casing through a radial abutment member which is fixed to the piston or tappet. In this way a normal position is defined for the piston and for a valve seat formed directly on the piston. However, there is no possibility of exerting any electromagnetic influence on the position of this valve seat.

The arrangement according to the invention of an abutment member which is fixed to a piston disposed between the actuator member and the output member and which passes with axial clearance through a recess formed in a valve closing member, being able to come to rest, radially outside thereof, on a stop fixed to the housing, offers the opportunity of actuating the valve closing member electromagnetically at any position of the piston, i.e. also starting from the position of rest, without thereby affecting the precise positioning of the valve closing member in its inoperative position. Braking thus can be initiated mechanically by no more than a very small movement of the actuator member even though the characteristics of the various springs usually provided in a brake pressure booster are not harmonized precisely with respect to one another.

The dimensions of the recess preferably are selected such that the abutment member is loaded by almost the full force of the valve spring when the valve closing member and the piston are in their common home position, while the sealing member is loaded only by a minor residual force of the valve spring. This provides the advantage that the sealing member need be biased only by a small spring force in the direction of the first valve seat with which the valve housing is formed.

Accordingly, it is convenient to subject the sealing member to the load of a spring which counteracts the valve spring and is weaker than the valve spring.

Furthermore, it is advantageous if the valve closing member is sealed with respect to the piston in an area between the second valve seat and the recess in the valve closing member by a seal whose effective sealing diameter corresponds at least approximately to the effective diameter of the second valve seat. Hereby it is avoided that the valve closing member becomes loaded in inoperative position by atmospheric pressure, counteracting the force of the valve spring. For this reason the valve spring may be rather weak, and that in turn has the advantage that small magnetic forces are sufficient to displace the valve closing member against the resistance of the valve spring.

A further development of the invention provides a construction which is especially space saving due to the fact that the electromagnet is installed in the valve housing and the valve closing member is designed to be the armature.

It is advantageous to surround the electromagnet by an annular space which forms part of a passage controlled by the valve seats and the sealing member. Air flows through the annular space at certain valve positions and thus the electromagnet is cooled.

Finally, with the arrangement according to the invention of the electromagnet inside the valve housing it is advantageous to arrange the valve spring between the piston and an extension of the valve closing member which extension is surrounded by the sealing member. Thus the valve spring is relocated from the range of direct action of the electromagnet into an area in which it cannot disturb the action of the electromagnet upon the valve closing member which embodies the armature.

Figure 2:
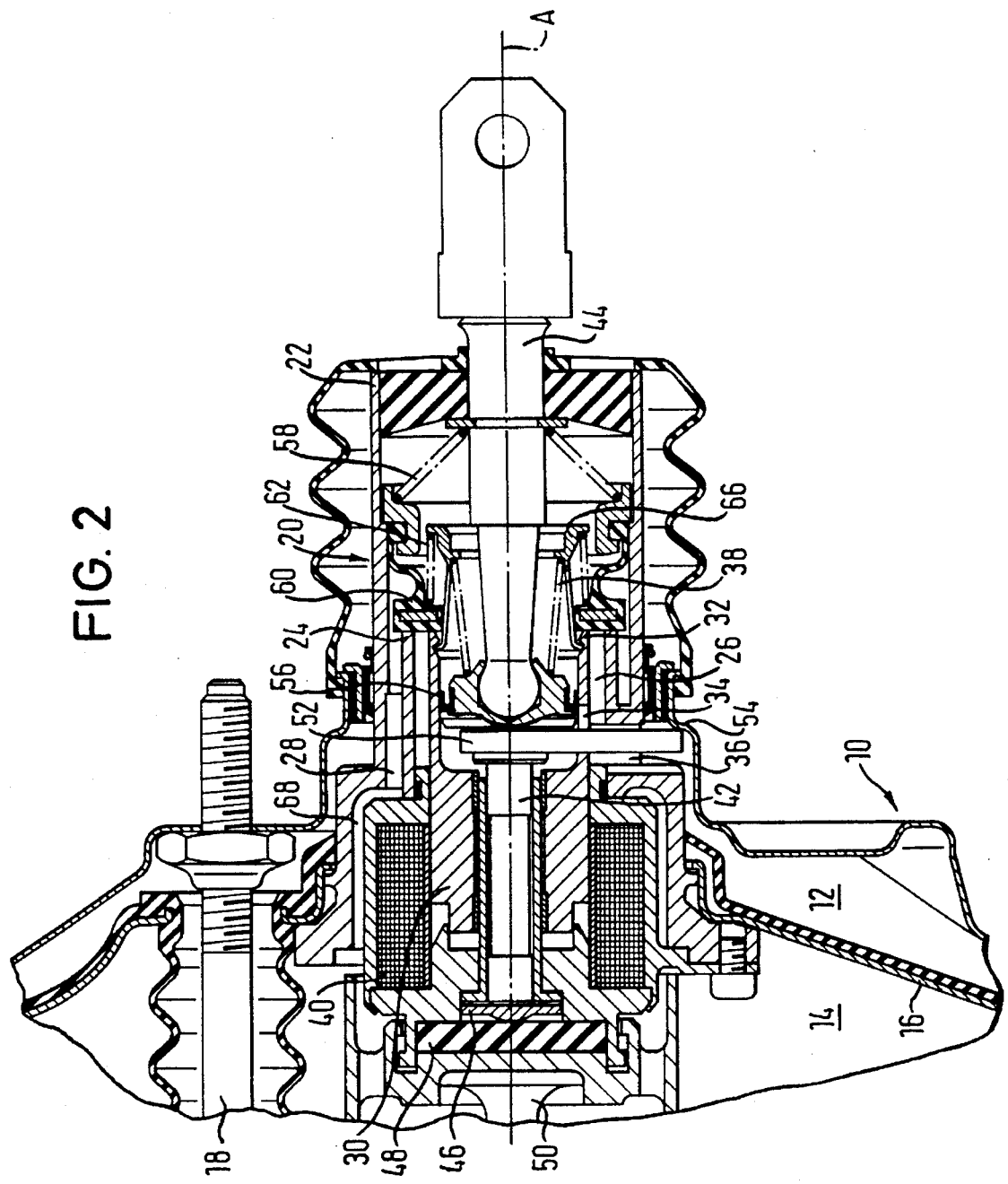

Embodiments of the invention will be described in greater detail below with reference to diagrammatic drawings, in which:

FIG. 1 is an axial sectional elevation of a pneumatic brake pressure booster with electromagnetic servo control, and FIG. 2 is a corresponding axial sectional view of a further development of the invention.

The brake pressure booster illustrated in FIG. 1 is essentially rotationally symmetric with respect to an axis A and comprises a booster casing 10, shown only in part, including a rear chamber 12 and a front chamber 14 separated from each other by a movable wall 16. The front and rear walls of the booster casing are interconnected by tie bolts 18 of which only one is shown.

The brake pressure booster comprises a control valve 20 of which the major part is installed in the booster casing 10 and which includes a valve housing 22 that is movable axially with respect to the same. An annular first valve seat 24 is formed in the interior of the valve housing 22 to separate a passage 26 which opens into the rear chamber 12 from a passage 28 which opens into the front chamber 14. Radially inside the passage 26, the valve housing 22 is formed with an axial stepped bore in which the sleeve-like valve closing member 30 is guided for displacement along the axis A. A second valve seat 32 is formed, concentrically with the first valve seat 24, at the rear end of the valve closing member 30, the right end in the drawing.

In front of and spaced from the second valve seat 32, i.e. to the left thereof in the drawing, the valve closing member 30 has a radial recess 34 which is followed in the valve housing 22 by another radial recess 36 which, however, is wider in axial direction. Moreover, an axially biased valve spring 38 is arranged inside the valve housing 22, urging the valve closing member 30 to the rear. Likewise installed in the control valve 20 is an electromagnet 40 with which the valve closing member 30 is coordinated to serve as armature.

Finally, a piston 42 is guided in a central bore of the valve housing 22, having its rear end connected to a rod-shaped actuator member 44 and carrying a piston head 46 at its front end. Together with a rubber element 48 embedded in the valve housing 22 and an output member 50 arranged in front thereof, the piston head provides a power ratio of the usual kind with brake pressure boosters.

An abutment member 52 engages in an annular groove in the piston 42 in such a manner as to be connected to the piston for joint axial movement. The abutment member 52 passes radially to the outside through the recesses 34 and 36 formed in the valve closing member 30 and in the valve housing 22, respectively. At the normal position shown of the piston 42, the abutment member rests on a stop 54 formed by a shoulder of the booster casing 10 and, therefore, being independent of the position of the valve housing 22.

An annular seal 56 is secured to the piston 42 in an area between the abutment member 52 and the actuator member 44 and is sealed against the valve closing member 30 along a diameter which corresponds to the effective diameter of the second valve seat 32. Atmospheric pressure prevails at all times behind the seal 56, i.e. to the right thereof in the drawing. The seal 56 prevents ambient air from flowing through the interior of the valve closing member 30 and further through the recesses 34 and 36 into the rear chamber 12.

The actuator member 44 normally is held by a rear return spring 58 in the inoperative position shown at which an annular sealing member 60 disposed in the usual way inside the valve housing 22 and biased forwardly by a spring 62 engages both valve seats 24 and 32. The movable wall 16 and the valve housing 22 connected to the same for common axial movement are maintained in their rear terminal positions shown by another return spring 64.

The brake pressure booster illustrated in FIG. 1 operates as follows:

In an unactuated state, the abutment member 52 engages the stop 54, whereby the inoperative position of the piston 42 is fixed. The valve closing member 30 engages the abutment member 52 at almost the full force of the valve spring 38, whereby the inoperative position of the valve closing member, too, is determined. The second valve seat 32, at the same time, engages the sealing member 60 under a minor residual force of the valve spring 38, the sealing member 60 simultaneously engaging the first valve seat 24.

Now, if the actuator member 44 linked, for instance, to the brake pedal of the motor vehicle, is moved forwards and thereby displaces the piston 42 forwardly, the latter takes along the valve closing member 30 by means of the abutment member 52 so that the valve seat 32 lifts off the sealing member 60, allowing ambient air which enters from the back into the valve housing 22 to flow through the passage 26 and further on through the radial recess 36 presented in the control valve 20 into the rear chamber 12. The front chamber 14 is separated from the rear chamber 12 because the sealing member 60 rests on the first valve seat 24. Consequently a pressure gradient builds up between the two chambers 12 and 14, causing the movable wall 16 to move to the front together with the valve housing 22 and the output member 50.

For any desired acceleration or boosting of this forward movement which is effected mechanically and of the output of power it involves, for instance, to the master cylinder of a vehicle brake system, the electromagnet 40 is excited so that it will pull the valve closing member 30 forwardly away from the abutment member 52, thereby enlarging the free flow cross section between the second valve seat 32 and the sealing member 60. This boosted output may be desirable, for example, when a vehicle to be slowed down is heavily loaded.

Upon switch-off of the electromagnet 40 the valve closing member 30 is urged back again by the valve spring 38 so as to engage the abutment member 52. The piston 42 and the valve closing member 30 together return into their inoperative positions as soon as the mechanical introduction of force through the actuator member 44 has ceased. The movable wall 16 and the valve housing 22 do not take part in this return movement as long as a pressure gradient continues to exist between the chambers 12 and 14. The pressure gradient is reduced by the valve closing member 30 briefly urging the sealing member 60 to the rear, whereby the latter is lifted off the first valve seat 24.

The further development illustrated in FIG. 2 differs from FIG. 1 above all in that the valve spring 38 is arranged in a cage-like extension 66 of the valve closing member 30. The cage-like extension 66 passes axially through the annular sealing member 60 without touching it and is snap-fitted from behind in an annular groove formed at the inside of the sleeve-like valve closing member 30 near the rear end thereof. The rod-shaped actuator member 44 extends in corresponding manner axially through the valve spring 38 and the cage-like extension 66 without contacting them.

Thus, as shown in FIG. 2, the electromagnet 40 is fitted in the valve housing 22 in a way so as to be enclosed by an annular space 68 which connects the front chamber 14 to the passage 28 and thus is ventilated so that the heat generated by the electromagnet 40 is dissipated quickly after each braking operation.

What is claimed is:

1. A pneumatic booster with electromagnetic servo control, for motor vehicle brake systems, comprising a booster casing (10) inside which a first chamber (12) and a second chamber (14) are separated from each other by a movable wall (16), a valve housing (22) which is connected to the movable wall (16) for joint axial relative movement with respect to the booster casing (10) and which includes a first valve seat (24), a sealing member (60) which is arranged to be axially movable inside the valve housing (22) and is biased in a direction towards the first valve seat (24), a piston (42) which is guided in the valve housing (22) so as to be axially displaceable and designed to transmit actuating forces from an actuator member (44) to an output member (50), a valve closing member (30) which is guided in the valve housing (22) so as to be axially displaceable with respect to the piston (42) and has a second valve seat (32) for cooperation with the sealing member (60), an abutment member (52) which projects to the outside substantially radially through a recess (36) formed in the valve housing (22) and defines an inoperative position of the piston (42) with respect to the booster casing (10) by abutting against a stop (54) formed at the booster casing (10), when the actuator member (44) is not actuated, a valve spring (38) which biases the valve closing member (30) in the direction of the sealing member (60), and an electromagnet (40) which, when energized, moves the valve closing member (30) away from the sealing member (60) against the resistance of the valve spring (38), characterized in that the abutment member (52) is connected firmly to the piston (42) and received in the recess (36) of the valve housing (22) and in a corresponding radial recess (34) of the valve closing member (30) with an axial clearance of such dimensions that the valve spring (38) holds the valve closing member (30) against the abutment member (52) when the electromagnet (40) is not energized, simultaneously holding the second valve seat (32) against the sealing member (60) when the piston (42) is in said inoperative position.

2. The booster as claimed in claim 1, characterized in that the recess (34) in the valve closing member (30) is dimensioned such that the abutment member (52) is loaded by almost the entire force of the valve spring (38), in a joint position of rest of the valve closing member (30) and the piston (42), while the sealing member (60) is loaded only by a minor residual force of the valve spring (38).

3. The booster as claimed in claim 2, characterized in that the sealing member (60) is loaded by a spring (62) which counteracts the valve spring (38) and is weaker than the valve spring (38).

4. The booster as claimed in any one of claims 1 to 3, characterized in that the valve closing member (30) is sealed off against the piston (42) in an area between the second valve seat (32) and the recess (34) formed in the valve closing member (30) by a seal (56) whose effective sealing diameter corresponds at least approximately to an effective diameter of the second valve seat (32).

5. The booster as claimed in any one of claims 1 to 3, characterized in that the electromagnet (40) is installed in the valve housing (22) and the valve closing member (30) is designed as a magnetic armature.

6. The booster as claimed in claim 5, characterized in that the electromagnet (40) is enclosed by an annular space (68) which is part of a passage (28) controlled by the valve seats (24, 32) and the sealing member (60).

7. The booster as claimed in claim 5, characterized in that the valve spring (38) is disposed between the piston (42) and an extension (66) of the valve closing member (30) which extension is surrounded annularly by the sealing member (60).

8. The booster as claimed in claim 6, characterized in that the valve spring (38) is disposed between the piston (42) and an extension (66) of the valve closing member (30) which extension is surrounded annularly by the sealing member (60).

* * * * *